United States Patent
Dülger et al.

(10) Patent No.: US 8,865,112 B2
(45) Date of Patent: Oct. 21, 2014

(54) PROCESS AND APPARATUS FOR MULTISTAGE THERMAL TREATMENT OF RUBBER WASTE, IN PARTICULAR SCRAP TIRES

(75) Inventors: Fikret Dülger, Vienna (AT); Niels Raeder, München (DE)

(73) Assignee: Pyrolyx AG, München (DE)

( * ) Notice: Subject to any disclaimer, the term of this patent is extended or adjusted under 35 U.S.C. 154(b) by 0 days.

(21) Appl. No.: 13/498,032

(22) PCT Filed: Sep. 25, 2009

(86) PCT No.: PCT/EP2009/062474
§ 371 (c)(1),
(2), (4) Date: Nov. 30, 2012

(87) PCT Pub. No.: WO2011/035812
PCT Pub. Date: Mar. 31, 2011

(65) Prior Publication Data
US 2013/0064754 A1     Mar. 14, 2013

(51) Int. Cl.
| | |
|---|---|
| C10B 53/07 | (2006.01) |
| C09C 1/48 | (2006.01) |
| C10B 47/44 | (2006.01) |
| B82Y 30/00 | (2011.01) |
| C10B 7/10 | (2006.01) |
| C10G 1/10 | (2006.01) |

(52) U.S. Cl.
CPC ............... C10B 53/07 (2013.01); C09C 1/482 (2013.01); C10B 47/44 (2013.01); B82Y 30/00 (2013.01); C10B 7/10 (2013.01); C10G 1/10 (2013.01); *C01P 2006/80* (2013.01); *C01P 2004/64* (2013.01)
USPC ...... 423/449.7; 202/117; 202/118; 423/447.1

(58) Field of Classification Search
CPC .......... C10B 53/07; C10B 7/10; C10B 47/44; C09C 1/485; C01P 2006/80; C01P 2004/64

USPC ..................... 423/449.1, 449.7; 202/117, 118
See application file for complete search history.

(56) References Cited

U.S. PATENT DOCUMENTS

| | | |
|---|---|---|
| 4,983,278 A | 1/1991 | Cha et al. |
| 6,835,861 B2 | 12/2004 | Nichols et al. |

(Continued)

FOREIGN PATENT DOCUMENTS

| | | |
|---|---|---|
| EP | 0 025 319 A1 | 3/1981 |
| EP | 1 163 092 | 12/2001 |

(Continued)

OTHER PUBLICATIONS

Christian Roy, Blaise Labrecque and Bruno de Caumia "Recycling of scrap tires to oil and carbon black by vacuum pyrolysis" Resources. Conservation and Recycling, 4 (1990) 203-213.*

(Continued)

*Primary Examiner* — Richard M Rump
(74) *Attorney, Agent, or Firm* — Brian B. Shaw, Esq.; Thomas B. Ryan; Harter Secrest & Emery LLP

(57) ABSTRACT

A process for multistage thermal treatment of rubber waste, in particular scrap tires, is proposed. The process comprises several steps of transferring a product granulate of rubber waste into three different sequencing heating zones of a reactor (10). In the heating zones (11a, 11b, 11c) the product granulate is heated at a first temperature between 100° to 200° C., preferably 150° to 180° C., then at a second temperature between 200° to 350° C. and at a third temperature between 300° to 600° C. The temperature is maintained until such time that no further oil is emitted within the respective heating zone. As a final step, the product granulate is removed from the reactor (10) and the desirable solid materials are separated.

7 Claims, 6 Drawing Sheets

(56) References Cited

U.S. PATENT DOCUMENTS

2002/0117388 A1* 8/2002 Denison ................. 201/25
2002/0119089 A1* 8/2002 Masemore et al. ........ 423/449.7

FOREIGN PATENT DOCUMENTS

| EP | 1 577 367 A1 | 9/2005 |
|---|---|---|
| JP | 48-75680 A | 10/1973 |
| WO | 00/53385 | 9/2000 |
| WO | 2007/015158 A1 | 2/2007 |

OTHER PUBLICATIONS

Ucar, Suat, et al. "Evaluation of two different scrap tires as hydrocarbon source by pyrolysis." Fuel 84.14 (2005): 1884-1892.*
Written Opinion of the International Searching Authority in corresponding PCT/EP2009/062474 (6 pages).
International Search Report in corresponding PCT/EP2009/062474 (4 pages).

* cited by examiner

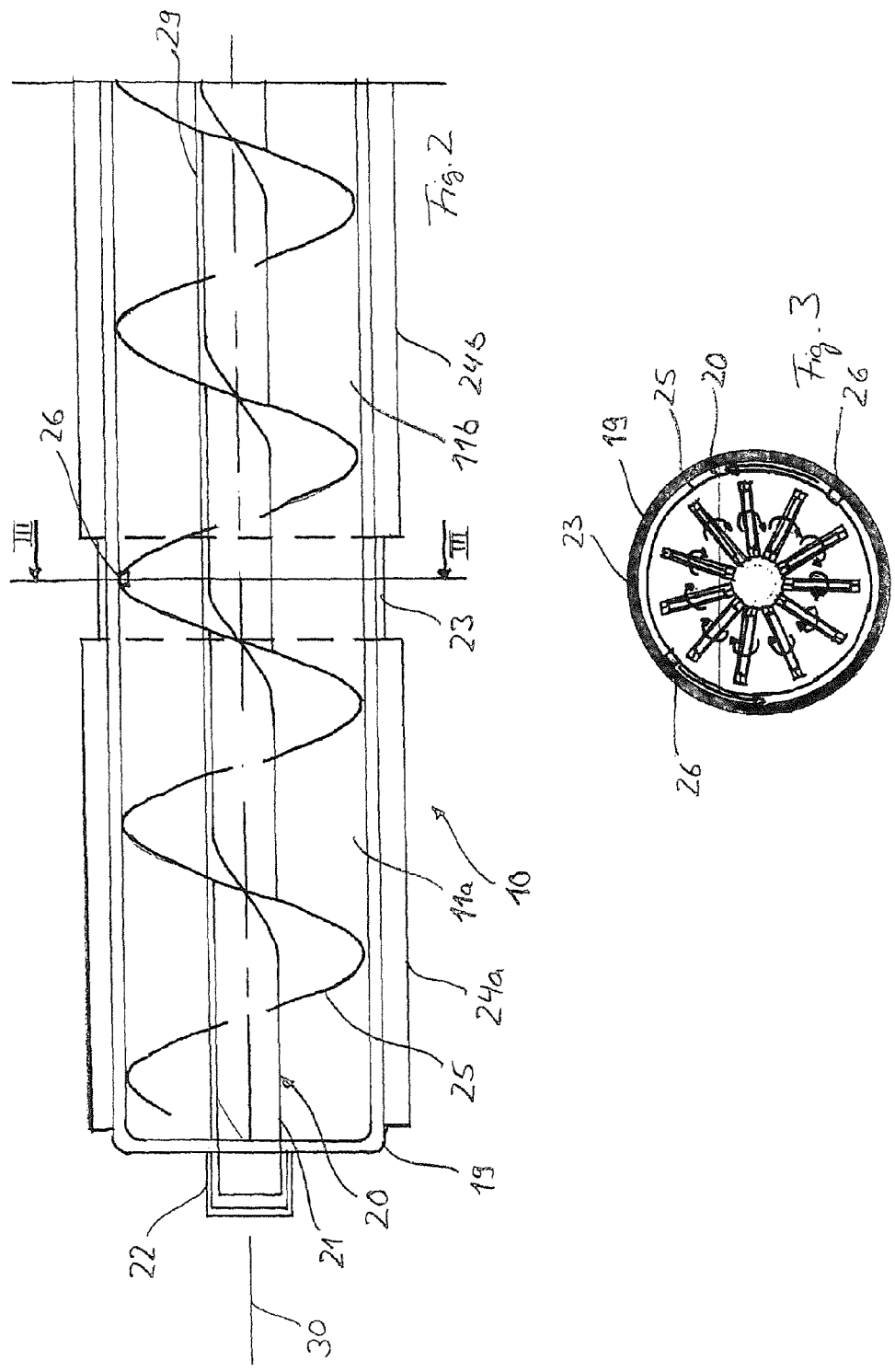

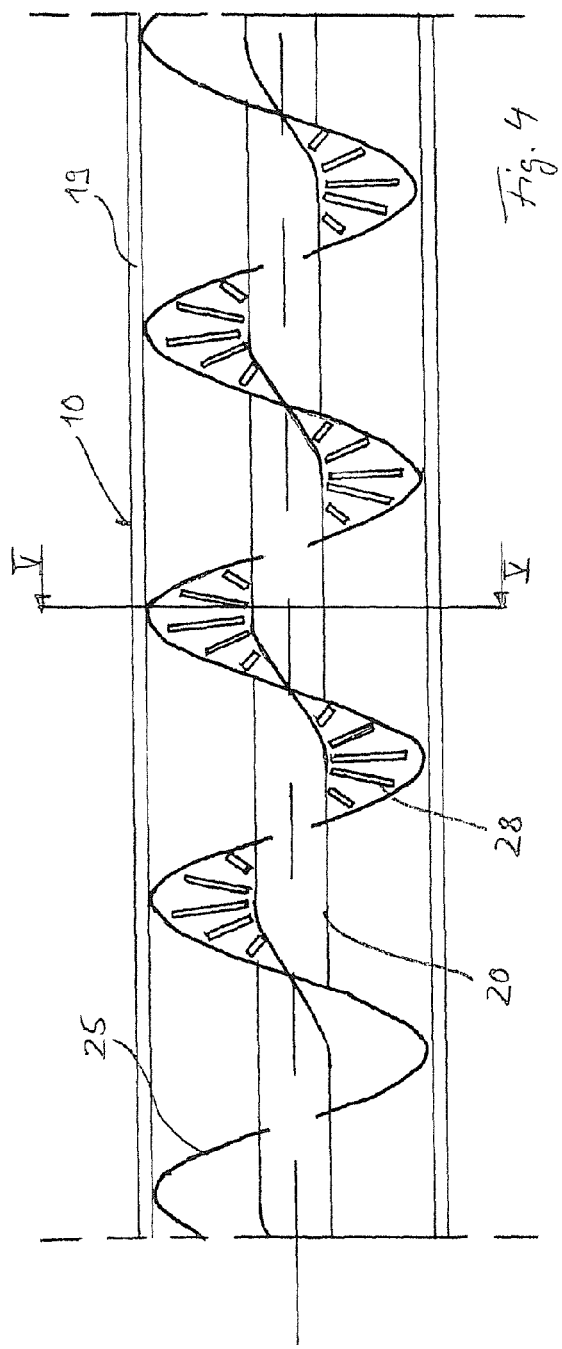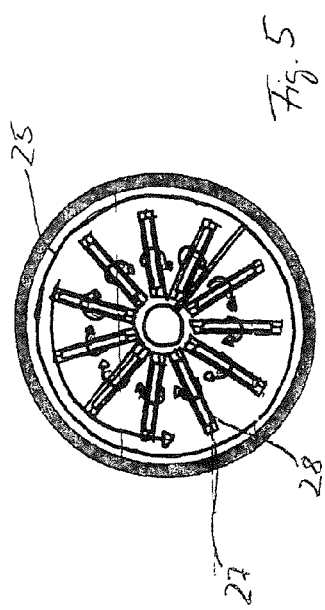

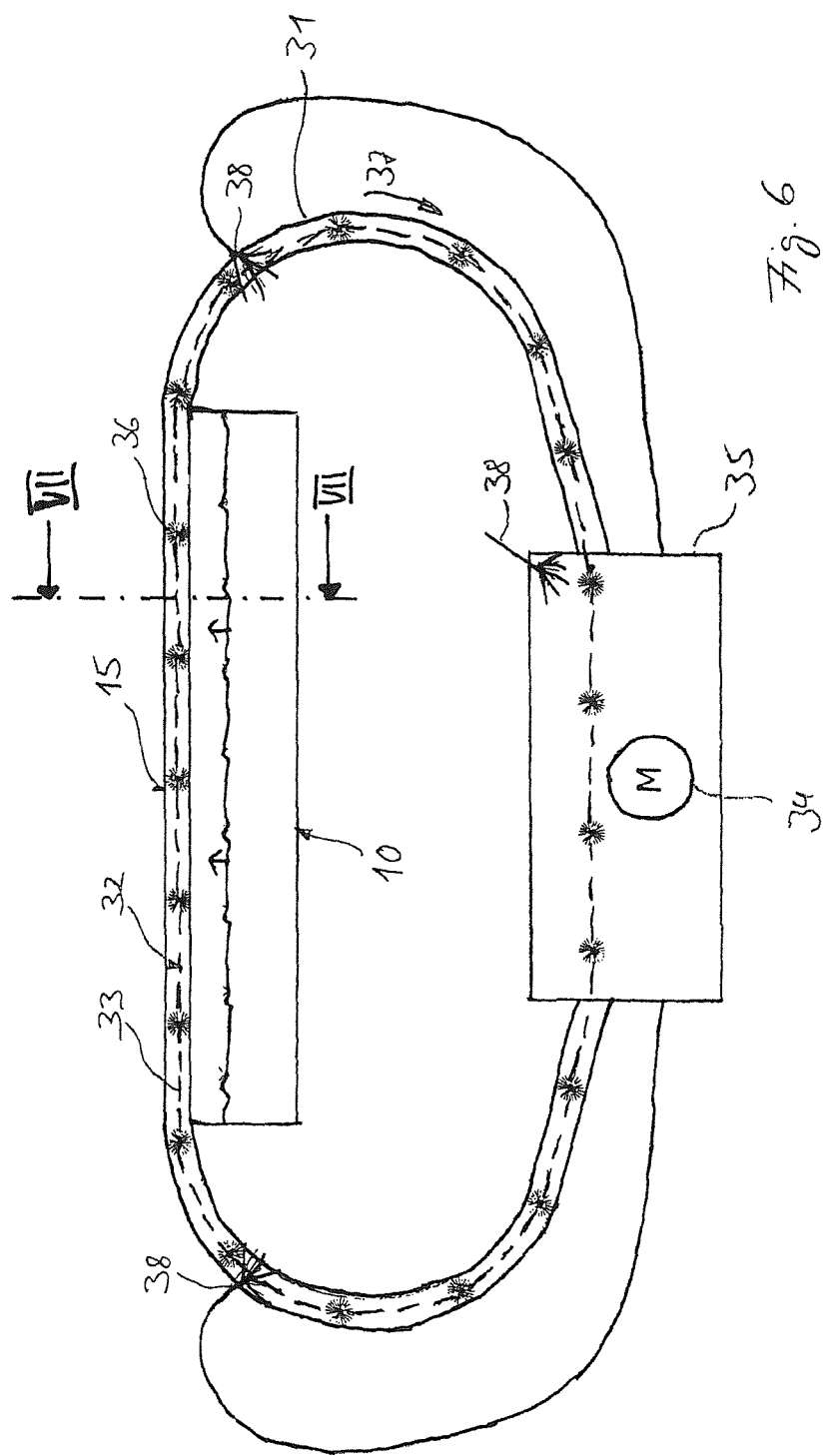

PROCESS AND APPARATUS FOR MULTISTAGE THERMAL TREATMENT OF RUBBER WASTE, IN PARTICULAR SCRAP TIRES

BACKGROUND OF THE INVENTION

The present invention concerns a process and an apparatus for the reclaiming of desirable materials from rubber waste, in particular scrap tires.

Approximately 3.2 million tons of scrap tires arise per year in the European Union. In the past most scrap tires were deposited in landfills. Since the year 2003 an EU Guideline has prohibited the dumping of scrap tires. Currently, scrap tires are burnt as boiler fuel in particular in the cement industry. Other used vehicle tires are recycled to be used in pavements.

Pyrolysis of scrap tires has also been known for many years. By pyrolysis which is carried out in the absence of oxygen at above 500° C. and which is an endothermic process the scrap tires are decomposed. Thus, substantial amounts of carbon black, steel, oil and gas can be recovered from the scrap tires. However, the pyrolysis processes for scrap has failed to become widely established in particular due to the low quality of the pyrolysis products which do not satisfy the commercial requirements.

In EP 1 163 092 B1 a pyrolysis process for scrap tires is disclosed in which a pyrolysis chamber with three heating zones comprising different temperatures is provided. The scrap tires are fed as granulate to the pyrolysis chamber comprising different heating zones. The pyrolysis chamber is rotated with respect to the flight to transport the granulated tire pieces. A first heating zone of the pyrolysis chamber has a temperature between 700° to 800° C. A second heating zone of the pyrolysis chamber has a second temperature between 600° to 700° C. A third heating zone has a temperature between 500° to 600° C.

In U.S. Pat. No. 6,835,861 B2 a low energy method of pyrolysis of rubber material is disclosed. The rubber material is inserted together with a clay catalyst into an pyrolysis apparatus with three different heating phases in a first embodiment. In the first phase, called activation phase, the rubber material is heated to temperature between 68.3° to 287.8° C. In the second phase the reaction temperature is held between 287.8° C. and 454.4° C. In the third phase the temperature is held at the same level by heating. In a second embodiment, which is also disclosed in U.S. Pat. No. 6,833,485 B2 and U.S. Pat. No. 7,341,646 B2 the rubber material is transported through three different zones, each zone comprising a temperature of preferably about 287.8° C. In both processes the catalyst is not removed after conclusion of the pyrolysis.

As mentioned above, one problem in the known processes for scrap tires is that the quality of the carbon black recovered is outside the commercial specifications for carbon black due to the either too high or too low temperature of the processes. Therefore the recovered carbon black is of only limited commercial use.

Consequently, it is one object of the present invention to provide a thermal treatment process and an apparatus for thermal treatment of rubber waste, in particular scrap tires, which provide recovered material of such high purity that it can be commercially used.

SUMMARY OF THE INVENTION

The present invention suggests a process for multistage thermal treatment of rubber waste, in particular scrap tires, comprising the following steps:

transferring a product granulate of the rubber waste from a supply into a pyrolysis reactor;

heating the product granulate at a first temperature between 100° to 200° C., preferably 150° to 180° C., in a first heating zone of the reactor so long until light oils are no longer emitted;

transferring the product granulate from the first to a second heating zone in the reactor;

heating the product granulate at a second temperature between 200° to 300° C. in a second heating zone of the reactor so long until medium heavy oils are no longer emitted;

transferring the product granulate from the second to a third heating zone in the reactor;

heating the product granulate at a third temperature between 300° to 600° C., preferably between 400° and 550° C., in a third heating zone so long until heavy oils are no longer emitted;

removing the product granulate from the pyrolysis reactor and separating the desirable solid materials.

wherein the process is carried out within a low pressure environment.

In the first heating zone a depolymerization of the rubber waste takes place. This process is different from the known pyrolysis processes.

The applicant has found that a slow and long-lasting thermal treatment process in the first heating zone at low temperature has the effect that the light oils do not form non-removable products which contaminate the carbon black. This also applies to the other steps carried out in the other heating zones of the reactor. Pyrolysis is only carried out in the third heating zone, where all possible contaminants are already removed, which results in the carbon black received after the third heating zone having a very high purity. In addition, the carbon black has a large surface which results in high adsorption properties. Owing to its special structure, the recovered carbon black floats on water. Therefore, the carbon black received after the third heating zone can be used as adsorption material in particular for the adsorption of oils and lipids.

Further developments in line with claim 1 are referred to in the dependent claims.

The multistage thermal treatment process is carried out within a low pressure environment in which the pressure is advantageously between 20 to 50 mbar.

The process is carried out in each heating zone very slowly for a time period between 2 to 4 hours. Such a slow thermal treatment process prevents the formation of non-removable products which contaminate the desirable materials.

According to one preferred embodiment, the carbon black recovered after the third heating zone is refined at high temperatures for a time period of about 2 hours. The carbon black received after the refining process has a very high percentage of purity comparable with commercial grade carbon black. Therefore, the carbon black recovered can be commercially used. In particular, the carbon black recovered can be used again in industrial production.

It is advantageous that the product granulate be moved slowly within and through the reactor.

According to one preferred embodiment, the product is moved by means of a conveyor screw.

The reactor is filled to about 60% of its volume.

A cleaning step can be carried out for about 2 hours at high temperatures without further feeding of the product.

According to a further aspect, the present invention also relates to an apparatus for multistage thermal treatment of rubber waste, in particular scrap tires, having a reactor comprising:
- a first heating zone which can be heated to a first temperature between 100° to 200° C., preferably 150° to 180° C.;
- a second heating zone which can be heated to a second temperature between 200° to 300° C. and
- a third heating zone which can be heated to a temperature between 300° C. to 600° C., preferably between 400° to 550° C., and
- a conveyor means which transports the product granulate within and through the reactor.

Accordingly, the product granulate is transported by means of the conveyor means through the different heating zones of the reactor.

According to one preferred embodiment the conveyor means is a driven conveyor screw.

In order to provide different speeds within the reactor, the conveyor screw can comprise worms of different pitch.

According to one preferred embodiment, the conveyor screw comprises recesses in which rollers are located to prevent depositing of the product.

It is further advantageous that the rollers should be staggered in the circumferential direction of the conveyor screw.

According to a further embodiment, the conveyor screw comprises at its outer circumference supports made of non-ferrous metal to support the inner wall of the reactor.

It is further advantageous that the reactor comprises a housing which is reinforced in the regions of the non-ferrous supports of the conveyor screw.

It is advantageous, that in the reinforced region of the reactor a reduced temperature should prevail. This causes condensation of oils within the reactor whereby the conveyor screw is lubricated in the region of the non ferrous supports.

According to one preferred embodiment the reactor comprises an upper portion in which a vapour exhaust is provided. During the thermal treatment process the vapour exhaust takes up gases and oils recovered from the product granulate by means of the process according to the invention.

According to one preferred embodiment the vapour exhaust comprises an annular pipe which is connected to a condenser.

It is further advantageous that a cleaning means is provided within the vapour exhaust.

According to one preferred embodiment the cleaning means is an annular driven chain on which a brush or brush elements are arranged.

According to a further embodiment the housing of the reactor comprises a longitudinal groove with a perforated sheet at the vapour exhaust in which the cleaning means is guided.

It is advantageous that the perforated sheet comprises longitudinal slots. These brush elements of the cleaning means are able to clean the annular pipe properly by gearing into the longitudinal slots.

An outlet conveyor screw is arranged at the outlet of the reactor. The conveyor screw conveys the pyrolysed product granulate from the reactor.

In another feature of the invention heating mats for heating the heating zones are arranged at the outside of the housing of the reactor.

Other features and advantages of the present invention will become apparent from the following more detailed description of the embodiments, which describe, by way of example, the principles of the invention.

BRIEF DESCRIPTION OF THE DRAWINGS

FIG. 2 shows a vertical partial section through the reactor of the apparatus according to the invention;

FIG. 3 shows a section along the lines III-III in FIG. 2;

FIG. 4 shows a vertical partial section through the reactor of the apparatus according to the invention;

FIG. 5 shows a vertical section along the line V-V of FIG. 4;

FIG. 6 shows a schematic view of the vapour exhaust of the reactor;

DESCRIPTION OF DRAWINGS

Figure 1:
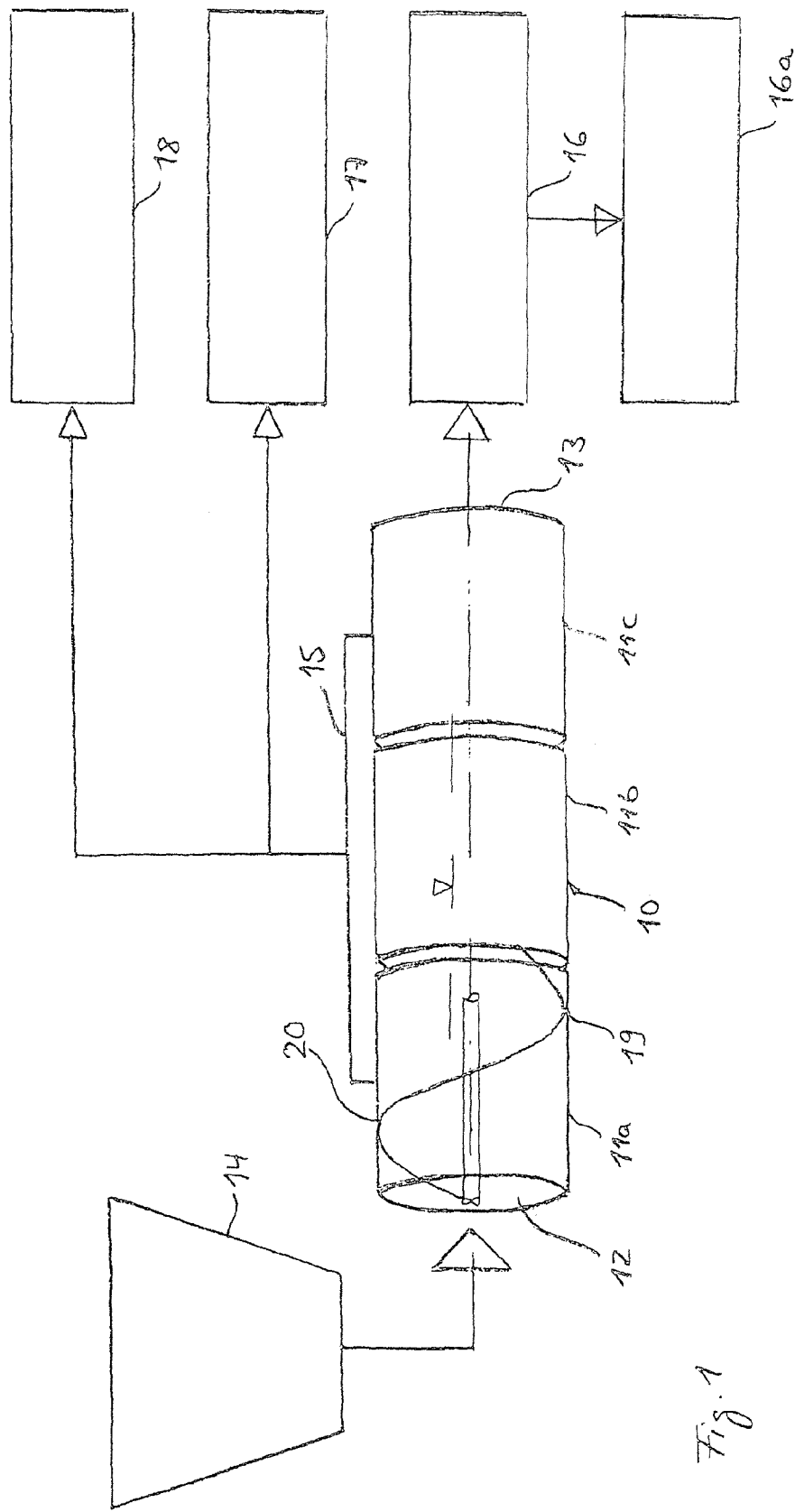
FIG. 1 shows a schematic view of the reactor used in the multistage thermal treatment process according to the invention.

FIG. 1 generally illustrates the multistage thermal treatment apparatus of the present invention. The apparatus comprises a reactor 10, which has a cylindrical housing 19. Along the longitudinal axis of the reactor 10 three different heating zones 11a, 11b, 11c are provided. The first heating zone 11a can be heated to a first temperature between 100° to 200° C., preferably 150° to 180° C. The second heating zone 11b can be heated to a second temperature between 200° to 300° C. The third heating zone 11c can be heated to a temperature between 300° to 600° C., preferably 440° to 550° C.

The reactor 10 further comprises a conveyor screw 20 which is driven by a driving means (not shown). The conveyor screw 20 is arranged within the housing 19 of the reactor 10.

A container 14 takes up product granulate of the rubber waste, in particular scrap tires. The product granulate is transported from the container 14 to the inlet 12 of the reactor 10. The product granulate is transported within and through the reactor 10 by means of the conveyor screw 20. Accordingly, the conveyor screw 20 transports the product granulate through the heating zones 11a, 11b, 11c to the outlet 13. Here, the solid product granulate in particular carbon black 16 is recovered.

The reactor 10 further comprises a vapour exhaust 15 for taking up the vapour phase of the thermally treated products. The vapour phase comprises so-called pyrolysis oil 17 and pyrolysis gas 18.

Within the reactor 10 a low pressure environment with a pressure of about 20 to 50 mbar is provided. The reactor 10 is filled to about 60% of its volume with product granulate.

Within the first heating zone 11a, a first process is carried out for a time period of between 2 to 4 hours until light oils are emitted anymore from the product granulate. The slow and long-lasting process in the first heating zone 11a at low temperatures has the effect that the light oils do not form non-removable products which contaminate the carbon black.

In the second heating zone 11b the product granulate is pyrolized at a second temperature until no medium heavy oils are emitted anymore. Again, the slow and long-lasting process prevents non-removable products which contaminate the carbon black from being formed.

In the third heating zone 11c the product granulate is pyrolized at a third temperature until no heavy oils are emitted anymore.

At the outlet 13 the product granulate is removed from the reactor 10. The desirable solid materials, in particular carbon black and steel remains, are separated.

The carbon black 16 recovered after the third heating zone 11c has a very high purity in particular if the temperature applied in the third heating zone 11c exceeds the threshold of 500° C. In addition the carbon black 16 has a large surface resulting in high adsorption properties. Owing to its structure the carbon black 16 floats on water. Thus, the carbon black 16 received can be used as adsorption material in particular for adsorbing oils and lipids.

If a lower temperature than 500° C. was applied in the third heating zone 11c the carbon black 16 can be refined at high temperatures of about 800° C. at low-pressure conditions for a time period of about 2 hours in order to receive commercial-grade carbon black 16a. The carbon black recovered has a purity comparable with commercial-grade carbon black and can therefore be commercially used.

The properties of the carbon black after the refining process and after the third heating zone 11c (T>500° C.) are listed in table I (see below).

TABLE I

Properties of carbon black after refining or heating at temperatures higher than 500° C.
Carbon Black Analysis

| Chemical Analysis/At % | |
| --- | --- |
| Carbon | 95.46-96.02 |
| Oxygen | 2.38-2.90 |
| Sodium | 0.27-0.5 |
| Magnesium | 0.06-0.11 |
| Aluminum | 0.12-0.25 |
| Silicon | 0.66-1.48 |
| Phosphorus | 0.02-0.04 |
| Sulfur | 0.24-0.61 |
| Calcium | 0.29-0.93 |
| Structure Analysis | |
| Particle size | ~40 nm |
| Structure | Blackberry-cluster |
| Location for formation of pores | between particles |

Details of the multistage thermal treatment apparatus will now be described with reference to the drawings.

FIG. 2 shows a partial section through the reactor 10. As shown, the reactor 10 comprises a cylindrical housing 19 extending along its longitudinal axis 30. Within the housing 19 a conveyor screw 20 is arranged for conveying the product granulate within and through the reactor 10.

The conveyor screw 20 comprises a shaft 21 which is supported by means of bearings 22 at the inlet 12 and the outlet 13 of the reactor 10. The conveyor screw 20 comprises a worm 25 with a variety of pitches to provide different speeds within the reactor 10. At the outer circumference of the worm 25 non-ferrous metal supports 26 are provided in order to support the conveyor screw 20 at the inner side of the housing 19 of the reactor 10.

At the housing 19 reinforcing rings 23 are provided in the area of the supports 26.

Heating mats 24a and 24b are arranged at the outer circumference of the housing 19. The heating mats 24a, 24b can be separately controlled in order to provide different temperatures within the heating zones 11a, 11b, 11c.

In the region of the reinforcing rings 23 a reduced temperature prevails. This causes a condensation of oil in the region of the supports 26 whereby the conveyors screw 20 is lubricated. The same effect occurs in the region of the supports 22.

FIG. 3 shows a vertical section along the lines III to III of FIG. 2. As shown, the non-ferrous supports 26 are supported by the housing 19 which is reinforced by the reinforcing ring 23 in this area.

Referring now to FIGS. 4 and 5, the conveyor screw 20 comprises rollers 28 arranged within the worm 25 of the conveyor screw 20. The rollers 28 prevent deposition of the product granulate on the conveyor screw 20.

As best shown in FIG. 5, the worm 25 comprises recesses 27 extending in the radial direction of the conveyor screw 20. Within each of the recesses 27 a rotating roller 28 is mounted.

FIG. 6 shows the vapour exhaust 15 of the reactor 10. The vapour exhaust 15 comprises an annular pipe 31 which is connected to a condenser 35. A cooling device (not shown) is attached to the annular pipe 31. Within the annular pipe 31 a cleaning means 32 is provided. The cleaning means 32 comprise a chain 33 which is driven by a motor 34. Brush elements 36 are arranged on the chain 33 at a distance from each other. When the cleaning means 32 is driven in the direction of arrow 37 the annular pipe 31 is cleaned. Furthermore, sprayers 38 are provided within the condenser 35 and within the annular pipe 31 for cleaning the brush elements by means of pyrolized oil.

Figure 7:
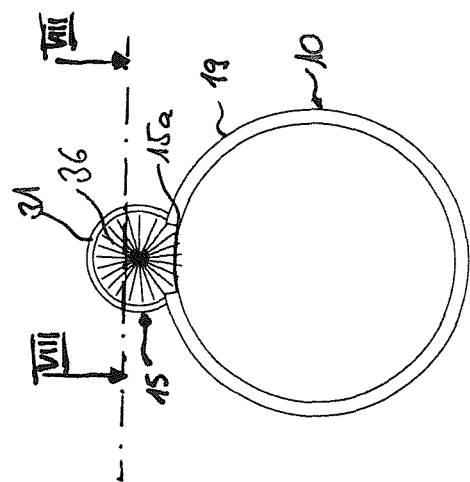
FIG. 7 shows a vertical section along the line VII-VII of FIG. 6.

FIG. 7 shows a vertical section along the line VII to VII of FIG. 6. The vapour exhaust 15 is located in an upper area of the reactor 10. In this region the housing 19 of the reactor 10 comprises a longitudinal groove 15a taking up and guiding the brush elements 36 of the cleaning means 32.

Figure 8:
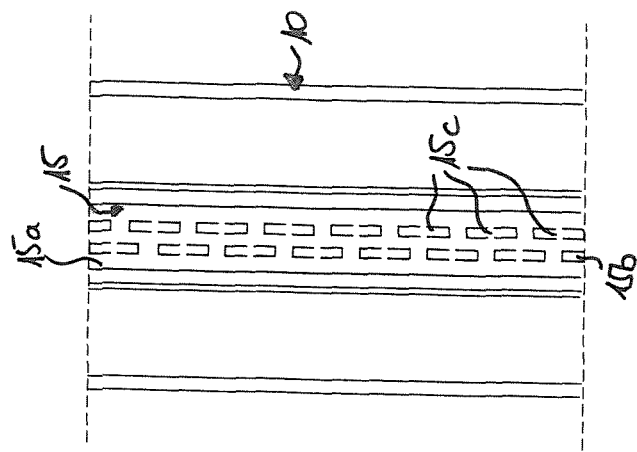
FIG. 8 shows a vertical section along the line VIII-VIII of FIG. 7.

FIG. 8 shows a vertical section along the line VIII to VIII of FIG. 7. A perforated sheet 15b is arranged at the bottom of the longitudinal groove 15a comprising a plurality of longitudinal slots 15c. When the chain 33 is guided through the annular pipe 33 the brush elements 36 gear into these longitudinal slots 15c and thus clean the annular pipe 31 of the vapour exhaust 15 thoroughly.

Figure 9:
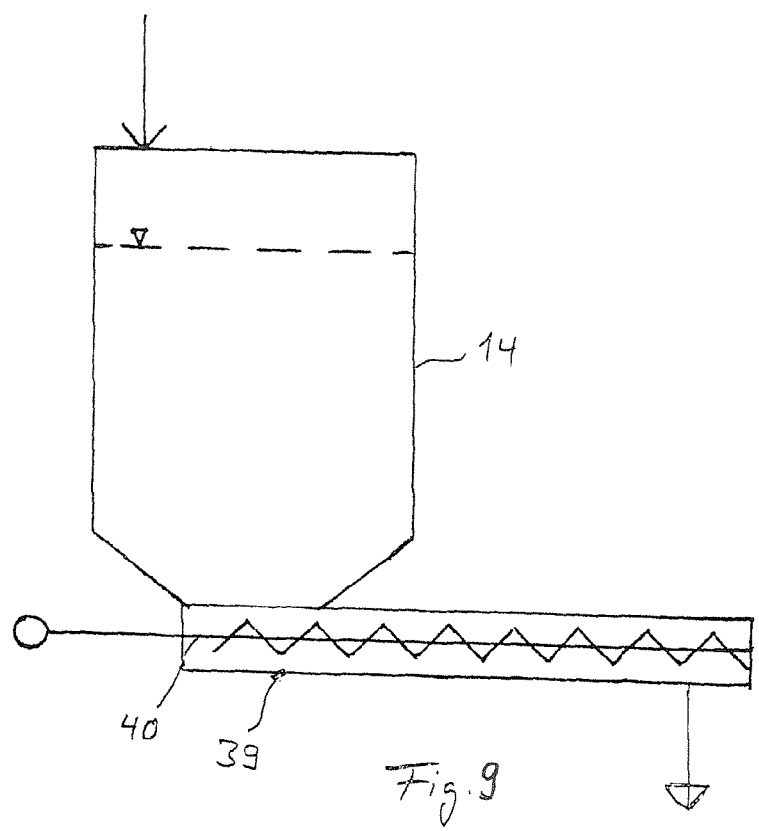
FIG. 9 is a schematic section through the granulate feeder arranged at the inlet of the reactor and FIG. 10 is a schematic view of the separator arranged at the outlet of the reactor.

FIG. 9 shows the container 14 for the product granulate the outlet of which comprises a conveyor 39 for compressing the product granulate and conveying the same to the inlet 12 of the reactor 10. The conveyor 39 comprises a driven conveyor screw 40. The container 14 is filled with a protective gas, such as argon, to prevent oxygen from entering the conveyer 39. Thus, oxygen is prevented from coming together with the product granulate.

Figure 10:
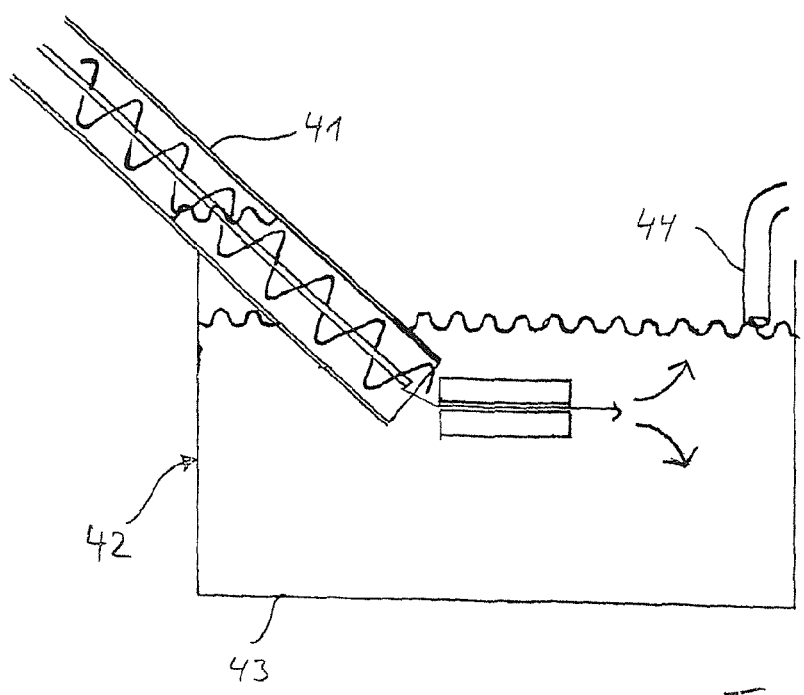

FIG. 10 shows the separator 42 which is arranged at the outlet 13 of the reactor 10. The product granulate is transported by means of a conveyor 41 to the separator 42. The separator 42 comprises a sedimentation basing 43. A mill 45 breaks up the product granulate into particles of about 1 to 10 μm and helps to separate the different materials. The solid materials are separated within the separator 42. The steel contained in the pyrolized product is deposited on the bottom of the sedimentation basing 43. Owing to its special structure the carbon black 26 accumulates on the surface of the water and can be removed by a stripper 44.

| List of references | |
| --- | --- |
| 10 | Reactor |
| 11a | First heating zone |
| 11b | Second heating zone |
| 11c | Third heating zone |
| 12 | Inlet |

-continued

List of references

| | |
|---|---|
| 13 | Outlet |
| 14 | Container |
| 15 | Vapor exhaust |
| 15a | Longitudinal groove |
| 15b | Perforated sheet |
| 15c | Longitudinal slots |
| 16 | Carbon black |
| 17 | Pyrolysis oil |
| 18 | Pyrolysis gas |
| 19 | Housing |
| 20 | Conveyor screw |
| 21 | Shaft |
| 22 | Bearing |
| 23 | Reinforcing ring |
| 24 | Heating mat |
| 25 | Worm |
| 26 | Support |
| 27 | Recess |
| 28 | Roller |
| 29 | Filling level |
| 30 | Longitudinal axis |
| 31 | Annular pipe |
| 32 | Cleaning means |
| 33 | Chain |
| 34 | Motor |
| 35 | Condenser |
| 36 | Brush elements |
| 37 | Arrow |
| 38 | Sprayer |
| 39 | Conveyer |
| 40 | Conveyor Screw |
| 41 | Conveyor |
| 42 | Separator |
| 43 | Sedimentation basing |
| 44 | Stripper |
| 45 | Arrow |
| 46 | Arrow |

The invention claimed is:

1. Process for multistage thermal treatment of rubber waste to produce carbon black comprising the steps of:
   transferring a product granulate of the rubber waste from a supply into a reactor;
   heating the product granulate for a time period of between 2 to 4 hours at a first temperature between 100° to 200° C. in a first heating zone of the reactor until light oils emitting from the product granulate at temperatures between 100° to 200° C. are no longer emitted;
   transferring the product granulate from the first heating zone to a second heating zone in the reactor;
   heating the product granulate for a time period of between 2 to 4 hours at a second temperature between 200° to 300° C. in the second heating zone of the reactor until medium heavy oils emitting from the product granulate at temperatures between 200° to 300° C. are no longer emitted;
   transferring the product granulate from the second heating zone to a third heating zone in the reactor;
   heating the product granulate for a time period of between 2 to 4 hours at a third temperature between 300° to 600° C. in the third heating zone until heavy oils emitting from the product granulate at temperatures between 300° to 600° C. are no longer emitted; and
   removing the product granulate from the reactor and separating the desirable solid materials, wherein each of the heating steps is carried out within a low pressure environment of about 20 to 50 mbar in each heating zone.

2. The process according to claim 1 in which the step of heating the product granulate at a first temperature includes heating the product granulate at the first temperature between 150° to 180° C., in the first heating zone of the reactor until light oils are no longer emitted.

3. Process for multistage thermal treatment of rubber waste to produce carbon black, comprising the steps of:
   transferring a product granulate of the rubber waste from a supply into a reactor;
   heating the product granulate for a time period of between 2 to 4 hours at a first temperature between 100° to 200° C. in a first heating zone of the reactor until light oils are no longer emitted;
   transferring the product granulate from the first heating zone to a second heating zone in the reactor;
   heating the product granulate for a time period of between 2 to 4 hours at a second temperature between 200° to 300° C. in the second heating zone of the reactor until medium heavy oils are no longer emitted;
   transferring the product granulate from the second heating zone to a third heating zone in the reactor;
   heating the product granulate for a time period of between 2 to 4 hours at a third temperature between 300° to 600° C. in the third heating zone until heavy oils are no longer emitted; and
   removing the product granulate from the reactor and separating the desirable solid materials including carbon black, wherein each of the heating steps is carried out within a low pressure environment of about 20 to 50 mbar and wherein the carbon black recovered is refined at high temperatures for a time period of about 2 hours.

4. The process according to claim 1 wherein the product granulate is slowly moved within and through the reactor.

5. The process according to claim 4, wherein the product is moved by means of a conveyor screw.

6. Process for multistage thermal treatment of rubber waste to produce carbon black, comprising the steps of:
   transferring a product granulate of the rubber waste from a supply into a reactor;
   heating the product granulate for a time period of between 2 to 4 hours at a first temperature between 100° to 200° C. in a first heating zone of the reactor until light oils are no longer emitted;
   transferring the product granulate from the first heating zone to a second heating zone in the reactor;
   heating the product granulate for a time period of between 2 to 4 hours at a second temperature between 200° to 300° C. in the second heating zone of the reactor until medium heavy oils are no longer emitted;
   transferring the product granulate from the second heating zone to a third heating zone in the reactor;
   heating the product granulate for a time period of between 2 to 4 hours at a third temperature between 300° to 600° C. in the third heating zone until heavy oils are no longer emitted; and
   removing the product granulate from the reactor and separating the desirable solid materials including carbon black, wherein each of the heating steps is carried out within a low pressure environment of about 20 to 50 mbar and wherein the reactor is filled to about 60% of its volume.

7. Process for multistage thermal treatment of rubber waste to produce carbon black, comprising the steps of:
   transferring a product granulate of the rubber waste from a supply into a reactor;
   heating the product granulate for a time period of between 2 to 4 hours at a first temperature between 100° to 200° C. in a first heating zone of the reactor until light oils are no longer emitted;

transferring the product granulate from the first heating zone to a second heating zone in the reactor;

heating the product granulate for a time period of between 2 to 4 hours at a second temperature between 200° to 300° C. in the second heating zone of the reactor until medium heavy oils are no longer emitted;

transferring the product granulate from the second heating zone to a third heating zone in the reactor;

heating the product granulate for a time period of between 2 to 4 hours at a third temperature between 300° to 600° C. in the third heating zone until heavy oils are no longer emitted; and removing the product granulate from the reactor and separating the desirable solid materials including carbon black, wherein each of the heating steps is carried out within a low pressure environment of about 20 to 50 mbar and wherein a cleaning step is carried out for about 2 hours at high temperatures without further product feeding.

\* \* \* \* \*